(No Model.)
S. M. STEVENS.
FIRE EXTINGUISHER.
No. 605,932. Patented June 21, 1898.
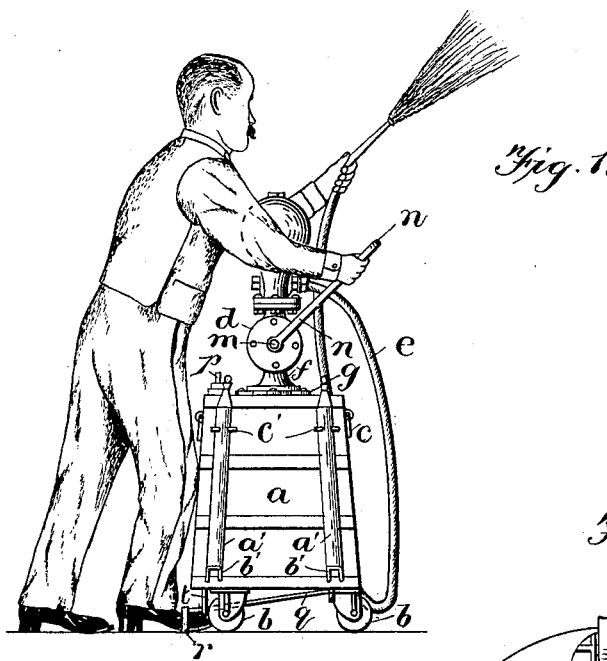
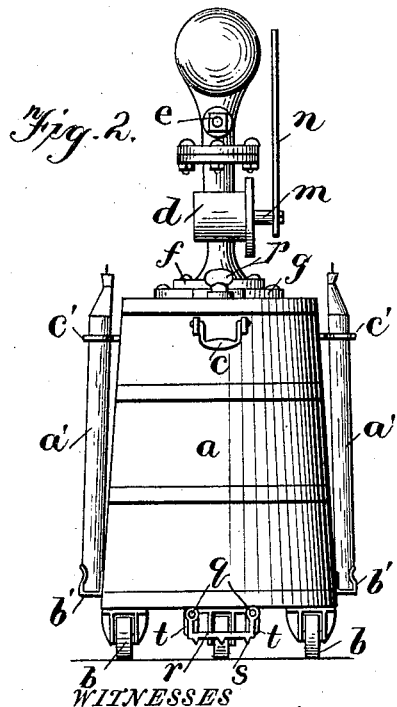
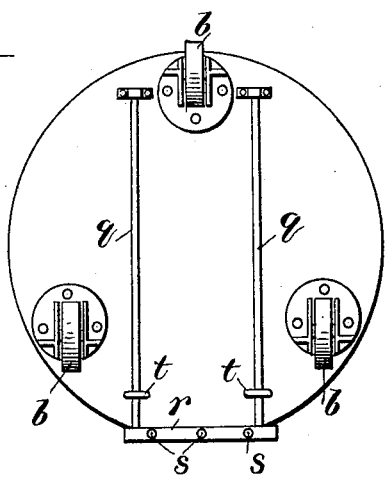
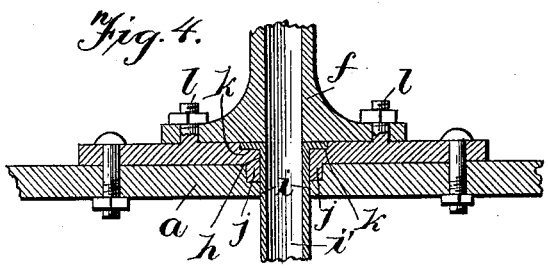

UNITED STATES PATENT OFFICE.

SAMUEL M. STEVENS, OF MANCHESTER, NEW HAMPSHIRE.

FIRE-EXTINGUISHER.

SPECIFICATION forming part of Letters Patent No. 605,932, dated June 21, 1898.

Application filed May 25, 1895. Serial No. 550,597. (No model.) Patented in Canada May 8, 1895, No. 48,879.

*To all whom it may concern:*

Be it known that I, SAMUEL M. STEVENS, of Manchester, in the county of Hillsborough and State of New Hampshire, have invented certain new and useful Improvements in Fire-Extinguishers, (for which a patent was obtained in Canada, No. 48,879, dated May 8, 1895;) and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in portable fire-extinguishing apparatus.

The invention consists in certain novel features of construction and in combinations of parts more fully and particularly hereinafter described, and pointed out in the claims.

Referring to the accompanying drawings, Figure 1 shows the portable fire-extinguisher tank in side elevation, with the operator forcing down the floor-lock and in the act of operating the pump and directing the discharge-hose. Fig. 2 is a rear elevation of the tank, the floor-lock shown in its normal elevated position. Fig. 3 is an enlarged bottom plan of the tank. Fig. 4 is an enlarged vertical sectional view taken centrally through the top of the tank, the pump-supporting means, and the suction-pipe.

In the drawings, $a$ is a suitably-constructed tank or closed vessel of the desired capacity and of such size as to be readily wheeled or pushed about the floor of a building. This tank is preferably cylindrical or slightly tapered in form and provided with bottom supporting-rollers $b$. Each roller is carried by a plate secured to the bottom of the tank, with depending ears between which the roller is journaled. Three rollers are preferably employed and arranged substantially as shown in Fig. 3, all rotating in parallel planes, with one front roller arranged at the front end of the diameter of the bottom, extending in the line of movement. The other two rollers are arranged on the opposite sides of the rear portion of the bottom, so that the tank can be easily and quickly moved forwardly and guided to either side, and a wide space is left between the two rear rollers. At its rear side the tank is provided with a handle $c$, so that the device can be easily moved and handled.

$d$ is a suitable force-pump mounted on the upper end of the tank and provided with a discharge-hose $e$, the nozzle of which can be easily controlled by the left hand of the operator or another person while the operator works the pump with his right hand. This pump is preferably of an oscillating construction, and its base $f$ is rigidly bolted to the plate $g$, secured to the top of the tank. This plate $g$ has a central opening $h$, registering with the opening $i$ in the tank top or head and provided with annular depending flange $j$, fitting into said opening $i$ to more firmly and rigidly hold the plate $g$ in the proper position and brace the parts. On its upper side this plate is provided with the annular seat $k$ around the opening $h$.

$i'$ is the suction-pipe, extending into the tank, preferably to a point near the bottom thereof. This pipe is preferably composed of soft metal or alloy, such as lead, and is forced through the opening in the plate $g$ and supported thereby and suspended with its upper end flared outwardly and down on the plate $g$ into the seat $h$ in said plate. This flattened-out portion forms the seat and bearing for the upper portion of the suction-pipe of the pump-carrier by the base $f$ and resting on and impinging against said flattened-out portion of the lead pipe.

The base-plate $g$ can be provided with upwardly-extending bolts $l$, formed integral therewith to pass through the flaring standard $f$ of the pump-cylinder and receive nuts by which the pump is rigidly and strongly secured in position.

The pump-cylinder has a shaft $m$ extending horizontally through its side and controlling the piston and provided with an upwardly-extending radial handle $n$, which rocks in an arc of about, say, one hundred and eighty degrees, so as to be very conveniently operated by either hand, preferably the right hand, of the person standing beside the tank, while the other hand can be used for directing the nozzle of the hose $o$ extending from the pump.

The top of the tank can be provided with a suitable filling-opening, closed by the turnable plug $p$.

The tank is provided with means for locking it in position, so that the pump can be rapidly operated without moving or swaying the tank, and such locking means can be easily controlled by the foot to lock the tank in position or release it so that it can be moved. A suitable locking means is here shown, comprising the spring-rods $q$, arranged beneath the tank, at their front ends rigidly secured to the front portion of the bottom, and from thence extending rearwardly and carrying the stirrup or yoke $r$, extending downwardly between its ends and provided on its under side with the sharp points or studs $s$, formed short and tapering, so as to quickly disengage themselves from the floor when the stirrup is released, and also to have sufficient strength to hold the tank, as hereinafter described. Suitable guides $t$ can be provided for the free vertically-moving ends of the springs carrying the stirrup. These springs normally hold the stirrup up against the under side of the tank, and when it is desired to lock the tank the operator places his foot in the stirrup and forces the same down against the floor and firmly and rigidly locks the tank against movement. The position of the operator is shown in Fig. 1, wherein the foot is shown holding the stirrup into engagement with the floor and the knee is pressed against the upper portion of the tank, thereby forming a most strong and rigid lock and brace to hold the tank in position while the pump is being operated.

Should it be desired to move the tank nearer to the fire, the operator raises his foot from the stirrup, and the springs immediately raise the stirrup from the floor and release the projections thereof, so that the tank can be quickly moved forward or in the desired direction. This tank is filled with some suitable fire-extinguishing chemical which in the presence of heat will generate a vapor that will destroy the flame-supporting qualities of the air.

In order to enable the fire to be attacked at several points, I provide the tank with several removable hand fire-extinguishers containing this liquid chemical, so that different persons can remove the hand-extinguishers and apply the liquid to the fire at different points, or to different fires, or where the fire is of such small extent as not to necessitate the employment of the pump and tank. Each hand fire-extinguisher $a'$ consists of elongated tubes having a tapering nozzle containing a stopper with an extractor, such as an eye or loop, so that the stopper can be drawn from the nozzle when it is desired to discharge the liquid contents from the tube. The tank is provided with any suitable number of these tubes arranged longitudinally on the exterior of the tank, preferably with their upper ends projecting above the upper end of the tank and preferably so that the tubes stand out a short distance from the tank, whereby they can be readily grasped and forced from the tank. Each tube is supported at its lower end by a bracket $b'$, secured to the lower portion of the exterior of the tank side. This bracket can be preferably formed of a single piece of wire bent outwardly and upwardly from the tank, with its outer upper end curved in to partially embrace the tube. The upper portion of each tube is held by the spring-clip $c'$, having its inner portion extending inwardly and formed to fit and be secured to the exterior of the tank, with the spring-arms extending outwardly therefrom to embrace the upper portion of the tube and hold it from the side of the tank, as shown in Fig. 2. When the tube is drawn from the tank, it passes outwardly between said arms, pressing them apart. The many advantages and great utility of this device are obvious. It is most simple, cheap, and durable in construction and composed of a minimum number of parts and can be easily and quickly controlled and operated and moved about the building.

It is evident that various changes might be made in the forms, arrangements, and constructions of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. A portable tank having the plate secured on its upper end with the flange depending into and held in the tank-top, a seat in the upper surface in said plate, a soft-metal suction-pipe extending into the tank and through said plate with its upper end upset into said seat, and the pump-body secured to said plate so that said upset end of the soft-metal pipe forms a bearing and packing, substantially as described.

2. The fire-extinguishing apparatus comprising the portable tank having the hand-pump on its upper end, supporting-rollers at its bottom, and springs carrying a foot-stirrup at their free ends provided with points on its under side and arranged at the rear side of the tank for the purpose set forth.

3. In a fire-extinguisher, the combination of a tank, a hole in the upper end thereof, the plate secured on the tank-top with an opening registering with said tank-opening and countersunk at its upper end, said plate provided with upwardly-extending bolts, suction-pipe $i'$ from the lower portion of the tank with its upper end upset into said countersunk portion, and the pump secured on said plate by said bolts, substantially as described.

4. A portable house-fire-extinguisher tank, comprising, in combination, the vertical tank having the bottom supporting-rollers, a hand-pump rigidly mounted on the tank, a foot-operated floor-lock arranged beneath and secured to the bottom of the tank and located between the supporting-rollers, and provided with a spring device yieldingly and normally holding the lock up from engagement with the floor so that the tank is instantly released, when the foot is removed from the lock, and can be easily rolled about on the floor, substantially as described.

5. A portable fire-extinguisher tank having bottom supporting-rollers, and a hand-pump, and arranged to be pushed along the floor to the location desired for operation of the pump, in combination with a foot-operated floor-lock carried by the tank and normally raised from the floor, and arranged to lock the tank to the floor against movement on its supporting-rollers, during the operation of the pump, substantially as described.

6. The portable fire-extinguisher comprising the movable upright tank having rolling supports at its bottom or lower end, a hand-pump at its upper end, and a normally-elevated foot-operated floor-lock arranged beneath and secured to the bottom of the tank so that the tank can be pushed along the floor, and the lock and the pump operated from behind, substantially as described.

7. The portable fire-extinguisher tank having a pump and bottom rolling supports, in combination with a foot-operated floor-lock arranged beneath and secured to the bottom of the tank and comprising horizontally-arranged spring-arms rigidly secured to the under side of the tank with their free ends springing upwardly and carrying the foot-piece or stirrup elevated from the floor in a position to be easily engaged and forced down by the foot of the operator to lock the tank to the floor and against movement, substantially as described.

8. A portable fire-extinguisher tank having a pump and bottom rolling supports, in combination with a foot-operated floor-lock carried by the tank and provided with a spring mechanism normally holding the lock elevated from the floor, said lock so arranged as to be easily forced down to lock and hold the tank against movement on its supports and to immediately move up and release the tank, automatically, when the foot is removed from the lock, substantially as described.

9. The vertical fire-extinguisher tank, in combination with a pump on the upper end thereof provided with an operating-handle, the handle at the rear side of the tank, the bottom supporting-rollers arranged with the single central forward roller with the remaining rollers in rear thereof at the bottom of the tank, and a floor-lock carried by the tank and normally elevated from the floor, so that the tank can be pushed forward by a single person, who by grasping said rear handle can tilt the tank onto said single roller and turn it quickly in any direction and force said lock down to the floor and hold the tank against movement while the pump is being operated with one hand and the hose directed with the other hand, substantially as described.

10. A tank having a plate thereon with a transverse opening into the tank, said plate countersunk or recessed around the upper end of the opening, in combination with a suction-pipe passing through said opening and having a soft-metal upper end upset down into said recess, and a pump having its base secured rigidly on said plate and onto said upset soft-metal end of the pipe, for the purpose stated, and having a passage in continuation of the suction-pipe, substantially as described.

In testimony that I claim the foregoing as my own I affix my signature in presence of two witnesses.

SAML. M. STEVENS.

Witnesses:
  C. M. WERLE,
  E. CALLAN DUFFY.